United States Patent
Cai et al.

(10) Patent No.: US 10,778,273 B2
(45) Date of Patent: Sep. 15, 2020

(54) SINGLE SWITCH MODULATION CIRCUIT AND WIRELESS CHARGING RECEIVER

(71) Applicant: Semtech Corporation, Camarillo, CA (US)

(72) Inventors: Wen Cai, Plano, TX (US); Feng Hou, Coppell, TX (US)

(73) Assignee: SEMTECH CORPORATION, Camarillo, CA (US)

(*) Notice: Subject to any disclaimer, the term of this patent is extended or adjusted under 35 U.S.C. 154(b) by 0 days.

(21) Appl. No.: 16/100,642

(22) Filed: Aug. 10, 2018

(65) Prior Publication Data

US 2019/0296786 A1 Sep. 26, 2019

Related U.S. Application Data

(60) Provisional application No. 62/645,292, filed on Mar. 20, 2018.

(51) Int. Cl.
| | |
|---|---|
| *H04B 1/3883* | (2015.01) |
| *H02J 50/80* | (2016.01) |
| *H02J 7/00* | (2006.01) |
| *H02J 7/04* | (2006.01) |
| *H02J 7/02* | (2016.01) |
| *H02J 50/20* | (2016.01) |
| *H02M 7/219* | (2006.01) |

(52) U.S. Cl.
CPC .......... *H04B 1/3883* (2013.01); *H02J 7/0068* (2013.01); *H02J 7/025* (2013.01); *H02J 7/04* (2013.01); *H02J 50/20* (2016.02); *H02J 50/80* (2016.02); *H02M 7/219* (2013.01)

(58) Field of Classification Search
CPC .. H02J 7/025; H02J 17/00; H02J 50/12; H02J 7/00; H02J 1/04; H02J 7/0052
USPC ................ 455/562.1, 573, 574, 127.1, 193.1
See application file for complete search history.

(56) References Cited

U.S. PATENT DOCUMENTS

| | | |
|---|---|---|
| 2011/0053500 A1 | 3/2011 | Menegoli et al. |
| 2014/0265610 A1 | 9/2014 | Bakker et al. |
| 2015/0341087 A1 | 11/2015 | Moore et al. |

FOREIGN PATENT DOCUMENTS

| | | |
|---|---|---|
| WO | 2017/027174 | 2/2017 |

OTHER PUBLICATIONS

Notification of Transmittal of the International Search Report and Written Opinion dated May 29, 2019 by the European Patent Office for International Application No. PCT/US2019/021821, 13 pages.

*Primary Examiner* — Fred A Casca
(74) *Attorney, Agent, or Firm* — Jackson Walker LLP; Christopher J. Rourk

(57) ABSTRACT

A wireless charging receiver that provides power delivered from a transmitter over a wireless path. The receiver includes a rectifier circuit, an LC circuit coupled to the rectifier circuit and the transmitter, a single switch modulation circuit coupled to the rectifier circuit and the LC circuit, an output circuit coupled to the rectifier circuit. The receiver further comprises an in-band controller coupled to the LC circuit and the single switch modulation circuit operational to detect a reflected parameter from incident RF power. A resistance value of the single switch modulation circuit can be set in response to a detected parametric value of the LC circuit. The resistance value can be set to cause the rectifier circuit to generate one of a stable RDCV value, an increased RDCV value, and a decreased RDCV value with respect to a normal PDC value in response to the received RF power.

14 Claims, 3 Drawing Sheets

SINGLE SWITCH MODULATION CIRCUIT AND WIRELESS CHARGING RECEIVER

CROSS REFERENCE TO RELATED APPLICATION

This present application claims priority to U.S. Provisional Patent Application No. 62/645,292, filed Mar. 20, 2018, entitled "A SINGLE SWITCH MODULATION CIRCUIT AND WIRELESS CHARGING RECEIVER," the entire contents of which is hereby incorporated by reference for all purposes as if set forth herein in its entirety.

TECHNICAL FIELD

The present disclosure relates generally to charging systems, and more specifically to systems and methods of modulation techniques used in wireless charging receivers to efficiently and cost effectively deliver power over a wireless path.

BACKGROUND OF THE INVENTION

Wireless charging systems are typically complicated, have low efficiency rates, and expensive. Some typical commercial solutions or components used therein include: IDT, Integrated Device Technology Inc. (P9025AC-R-EVK, P9221-R-EVK); NXP USA Inc. (WPR 1500-BUCK); STMicroelectronics (STEVAL-ISB036V1, STEVAL-ISB038V1R, STEVA1-ISB040V1); Texas Instruments wireless charging receivers (BQ51013BEVM, BQ51050BEVM, BQ51025EVM, BQ51221EVM); and Semtech wireless charging receivers (TSDMRX-5W-EVM, TSDMRX-10W-EVM, TSDMRX-19V-20W-EVM, TSWIRX-5V2-EVM). Prior art patents include: U.S. Pat. No. 5,963,012—Wireless battery charging system having adaptive parameter sensing; U.S. Pat. No. 8,111,042—Integrated wireless resonant power charging and communication channel; and U.S. Pat. No. Re. 44,713—Wireless charger system for battery pack solution and controlling method thereof. The solutions presented herein overcome the limitations of the prior art systems.

SUMMARY OF THE INVENTION

A wireless charging receiver is provided for receiving RF power from a transmitter and delivering the power in an efficient and cost effective manner. The receiver can receive RF power and rectify the power so that reflected signals from incident power have a minimal effect on power provided to an output circuit, such as a regulator or battery charger. The receiver is capable of providing DC power through more efficient filtering and rectification circuitry and can do so using minimal relative circuit configurations.

In an embodiment, a wireless charging receiver for receiving RF power from a transmitter is provided. The receiver can include a rectifier circuit, an LC circuit coupled to the rectifier circuit and the transmitter, a single switch modulation circuit coupled to the rectifier circuit and the LC circuit, an output circuit coupled to the rectifier circuit and other suitable components, wherein a resistance value of the single switch modulation circuit can be set in response to a detected parametric value of the LC circuit.

In the embodiment, the receiver comprises an in-band controller coupled to the LC circuit and the single switch modulation circuit operational to detect reflected power from incident RF power. The resistance value can be set to cause the rectifier circuit to generate a stable primary domain controller (PDC) value with respect to a normal (This one was already identified.) rectified direct-current voltage (RDCV) value in response to the reflected power detected. The resistance value can also or alternatively be set to cause the rectifier circuit to generate an increased PDC value with respect to a normal PDC value in response to the reflected power detected. The resistance value can also or alternatively be set to cause the rectifier circuit to generate a decreased RDCV value with respect to a normal PDC value in response to the reflected power detected. The single switch modulation circuit can include one or more of a bipolar junction transistor (BJT), metal-oxide semiconductor field-effect transistor (MOSFET), or junction field effect transistor (JFET). The output circuit can include one or more of a switching voltage regulator. a linear voltage regulator, or a battery charger.

In yet another embodiment, a wireless charging receiver for receiving RF power from a transmitter is provided. The receiver can include a rectifier circuit, an LC circuit coupled to the rectifier circuit and the transmitter, a single switch modulation circuit coupled to the rectifier circuit and the LC circuit and other suitable components, wherein a resistance value of the single switch modulation circuit can be set in response to a detected parametric value of the LC circuit.

In the other embodiment, the receiver can include an in-band controller coupled to the LC circuit and the single switch modulation circuit that is operational to detect reflected power from incident RF power. The resistance value can be set to cause the rectifier circuit to generate a stable RDCV value with respect to a normal value in response to the reflected RF power. The resistance value can also or alternatively be set to cause the rectifier circuit to generate an increased RDCV value with respect to a normal value in response to the reflected power. The resistance value can also or alternatively be set to cause the rectifier circuit to generate a decreased RDCV value with respect to a normal value in response to the reflected power. The single switch modulation circuit can include one or more of a BJT, MOSFET, or JFET.

In yet another embodiment, a wireless charging receiver for receiving RF power from a transmitter is provided. The receiver can include a rectifier circuit, an LC circuit coupled to the rectifier circuit and the transmitter, a modulation circuit coupled to the rectifier circuit and the LC circuit, an output circuit coupled to the rectifier circuit and other suitable components, wherein a resistance value of the single switch modulation circuit can be set in response to a detected parametric value of the LC circuit.

In the other embodiment, the receiver can include an in-band controller coupled to the LC circuit and the single switch modulation circuit operational to detect a reflected power from incident RF power. The resistance value can be set to cause the rectifier circuit to generate one or more of a stable RDCV value with respect to a normal value in response to the reflected power, an increased RDCV value with respect to a normal value in response to the reflected power, a decreased RDCV value with respect to a normal value in response to the reflected power or other suitable signals. The single switch modulation circuit can include one or more of a BJT, MOSFET, or JFET. The output circuit can be one of a switching voltage regulator, a linear voltage regulator, or a battery charger. The modulation circuit can be a single switch circuit or other suitable circuits.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE PREFERRED EMBODIMENTS

Figure 1A:
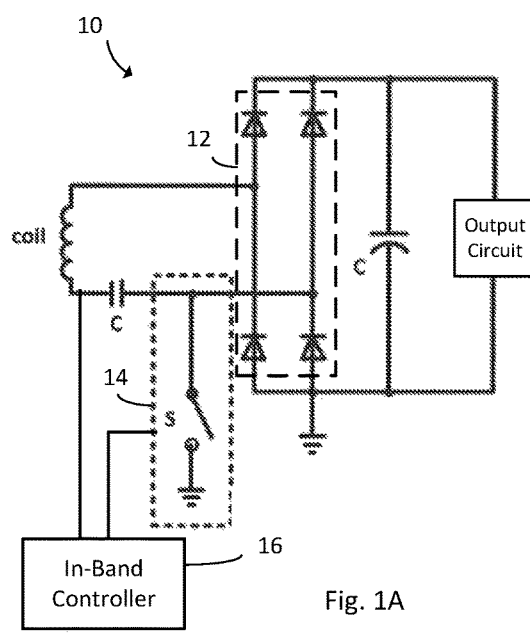
FIG. 1A depicts a wireless charging receiver and modulation circuit having a single switch, according to certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the description that follows, like parts are marked throughout the specification and drawings with the same reference numerals. The drawing figures may not be to scale and certain components can be shown in generalized or schematic form and identified by commercial designations in the interest of clarity and conciseness.

The example embodiments presented herein are directed to system, methods, and apparatus products for use with a wireless charging system. The system includes a novel, innovative wireless charging receiver. The receiver receives RF power from a transmitter and delivers the power in an efficient and cost effective manner. The receiver filters and rectifies the power so that reflected signals from incident power has minimal or no effect on provided to output circuitry. The receiver is capable of providing DC power through using a minimal circuit configuration. In addition, in some use cases the receiver can be coupled directly to a battery charger or alternatively to a regulator.

Figure 1B:
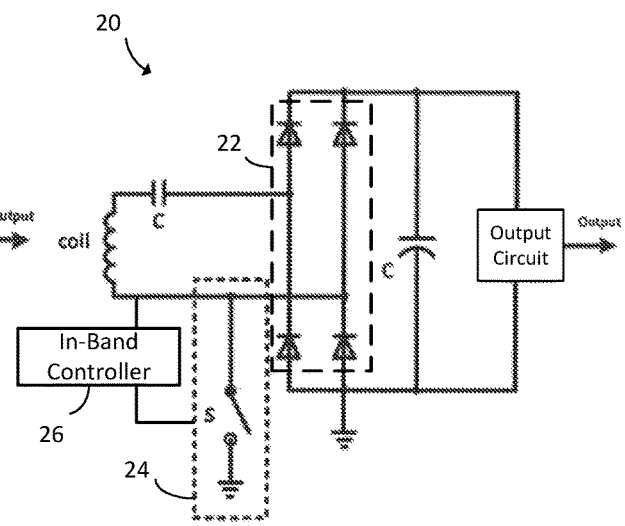
FIG. 1B depicts an alternative wireless charging receiver and modulation circuit having a single switch, according to certain example embodiments.

Referring now to FIGS. 1A and 1B, illustrated are wireless charging receivers and modulation circuits having a single switch, according to a certain embodiment, denoted generally as 10 and 20, respectively. In the embodiments of FIGS. 1A and 1B, the receivers 10, 20 comprise rectifiers 12, 22, modulation circuits 14, 24, in-band controllers 16, 26, LC input circuit, and output circuits. The modulation circuits 14, 24 can comprise only one switch (S) or other suitable components. The switch (S) can be connected to either middle point of the rectifiers 12, 22 and another terminal can be connected to ground. The gate voltage of the switch (S) can be enlarged in a controlled way in order to adjust the on-state resistance to a desired value. The on-state resistance can be adjusted to desired values based on feedback from the respective in-band controllers 16, 26 so that the parametric value of the on-state resistance and LC circuit can be adjusted in order to maximize efficiency. If the desired equivalent resistance is too low, higher equivalent resistance can be achieved by decreasing the gate voltage of the switch. In other words, depending on the application, the equivalent resistance of the switch can be adjusted to change the parametric value of switch resistance and the LC circuit. In doing so, the output direct-current voltage (RDCV) of the rectifier can be adjusted or held steady, depending on application requirements, so as to compensate for reflected power loss.

Figure 2A:
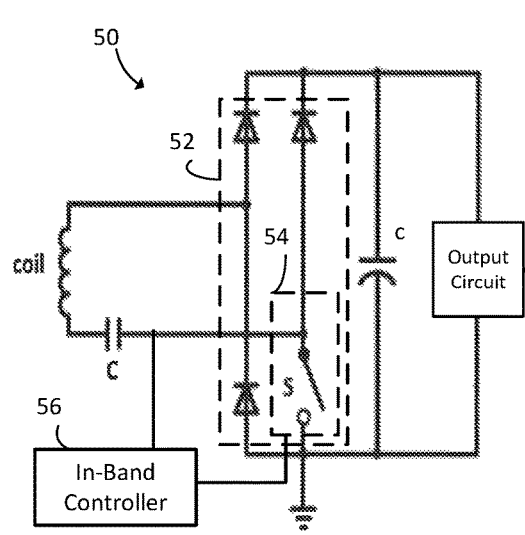
FIG. 2A depicts a wireless charging receiver and modulation circuit having a single switch integrated with a rectifier, according to certain example embodiment.
Figure 2B:
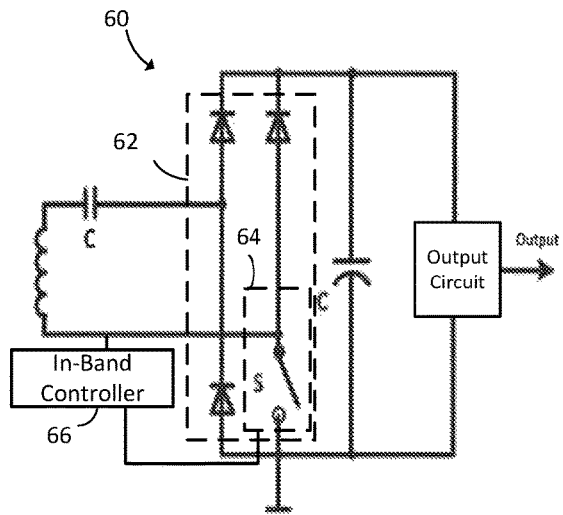
FIG. 2B depicts an alternative wireless charging receiver and modulation circuit having a single switch integrated with a rectifier, according to certain example embodiments.

Referring to FIGS. 2A and 2B, illustrated are wireless charging receivers and modulation circuits having a single switch integrated with a rectifier, according to certain example embodiments, denoted generally as 50 and 60, respectively. In the embodiments of FIGS. 2A and 2B, the receivers 50, 60 comprise rectifiers 52, 62, modulation circuits 54, 64, in-band controllers 56, 66, LC circuits, and output circuits. The modulation circuits 54, 64 can comprise only one switch (S) or other suitable components. In this embodiment, since an FET includes a body diode, the FET switch (S) can be included in the rectifiers 52, 62. The gate voltage of the switch (S) can be enlarged in a controlled way in order to adjust the on-state resistance to a desired value. The on-state resistance can be adjusted to desired values based on feedback from the respective in-band controllers 56, 66 so that the parametric value of the on-state resistance and LC circuit can be adjusted in order to maximize efficiency. If the desired equivalent resistance is too low, higher equivalent resistance can be achieved by decreasing the gate voltage of the switch.

Figures 3A, 3B:
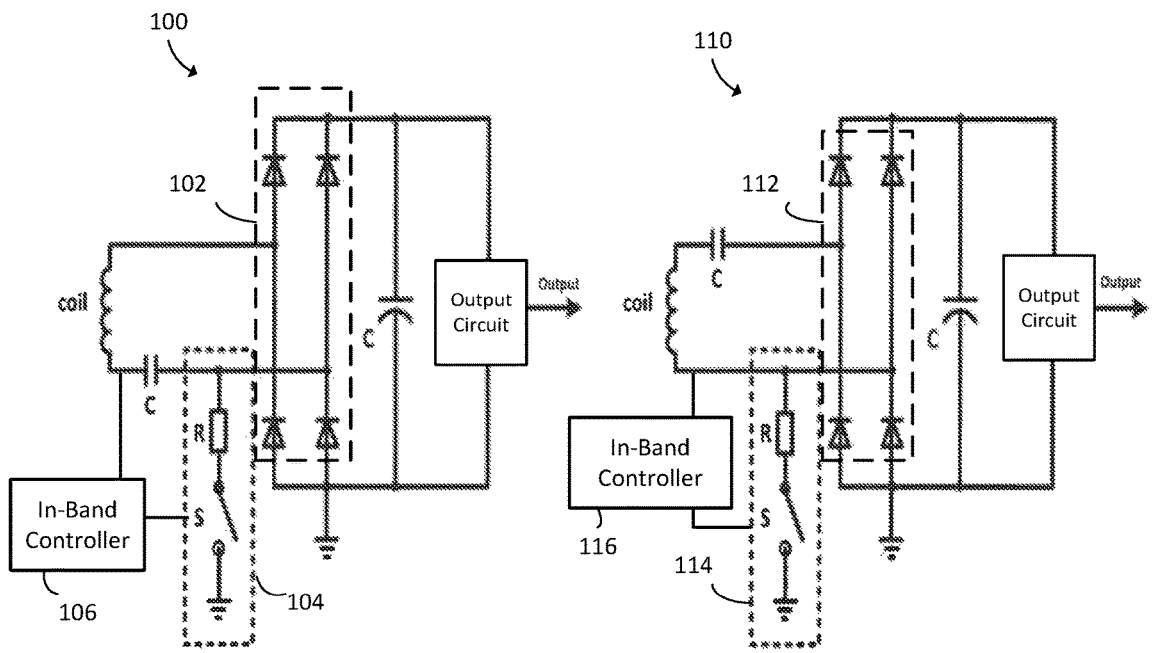
FIG. 3A depicts a wireless charging receiver and modulation circuit having a single switch and resistor, according to certain example embodiments.
FIG. 3B depicts an alternative wireless charging receiver and modulation circuit having a single switch and resistor, according to certain example embodiments.

Referring now to FIGS. 3A and 3B, illustrated are wireless charging receivers and modulation circuits having a single switch and resistor, according to certain example embodiments, denoted generally as 100 and 110, respectively. In the embodiments of FIGS. 3A and 3B, the receivers 100, 110 comprise rectifiers 102, 112, modulation circuits 104, 114, in-band controllers 106, 116, LC circuits, and output circuits. The modulation circuits 104, 114 can comprise only one switch (S) and one resistor or other suitable components. The modulation circuits 104, 114 can be connected to either middle point of the rectifiers 102, 112 and another terminal can be connected to ground. In this embodiment, the modulation circuits 104, 114 include a resistor in series with the switch (S). By selecting the resistance of the resistor, the equivalent on-state resistance can be adjusted to desired values based on feedback from the respective in-band controllers 106, 116 in order to adjust the parametric value of the respective LC circuit. If the desired equivalent resistance is too low, higher equivalent resistance can be achieved by decreasing the gate voltage of the switch.

Figures 4A, 4B:
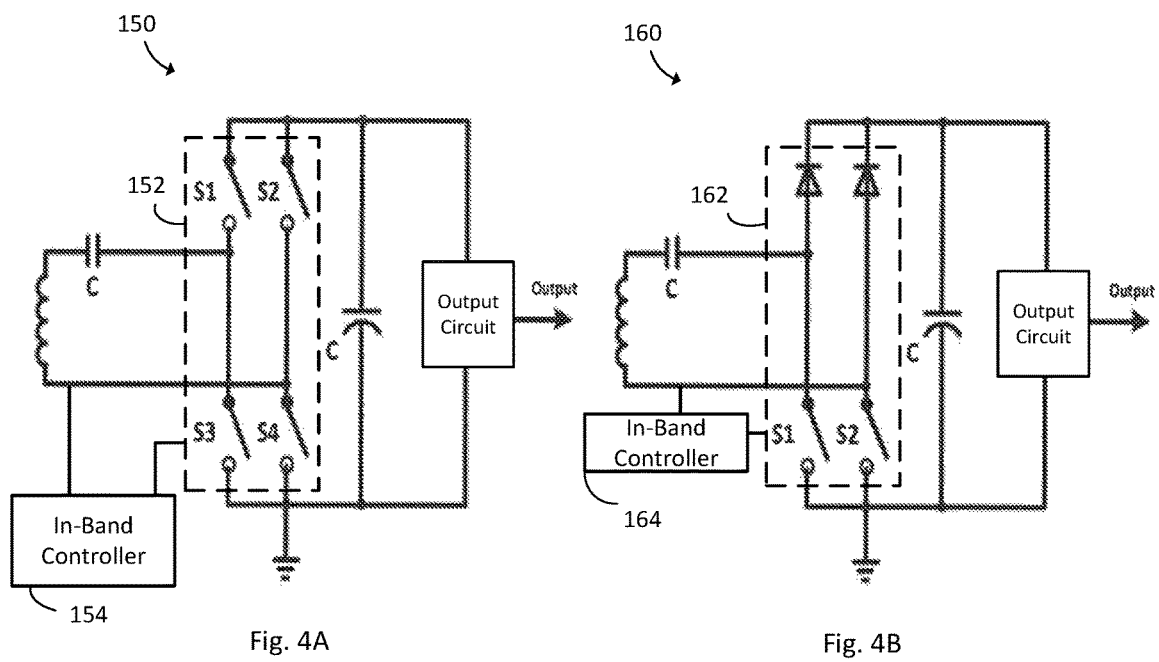
FIG. 4A depicts a wireless charging receiver and modulation circuit integrated with a synchronous rectifier, according to certain example embodiments.
FIG. 4B depicts an alternative wireless charging receiver and modulation circuit integrated with a synchronous rectifier, according to certain example embodiments.

Referring now to FIGS. 4A and 4B, illustrated are wireless charging receivers and modulation circuits integrated with synchronous rectifiers, according to certain example embodiments, denoted generally as 150, 160, respectively. The receivers 150, 160 comprise rectifiers 152, 162, in-band controllers 154, 164, LC circuits, and output circuits. Rectifier 152 includes S1-S4 wherein the gate voltage of one of the switches can be modulated in response to feedback from the in-band controller 154 in order to introduce a resistive value so as modify or adjust the parametric value of the LC circuit so that the receiver 150 can operate more efficiently. Rectifier 162 includes two diodes and two switches S1 and S2 wherein the gate voltage of one of the switches can be modulated in response to feedback from the in-band controller 164 in order to modify or adjust the parametric value of the LC circuit so that receiver 160 can run more efficiently.

Figure 5:
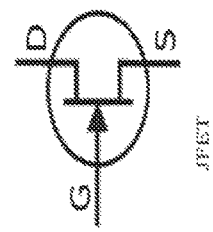
FIG. 5 depicts exemplary JFET, MOSFET, and BJT switches.
Figure 5:
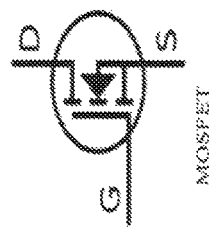
Figure 5:
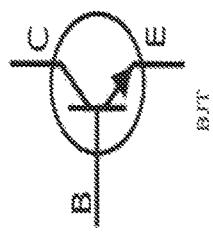

The LC input circuits in the aforementioned embodiments of FIGS. 1-4 can be in parallel with a respective modulation circuit in two different configurations, as illustrated for example in FIGS. 1A and 1B with either L or C being in parallel with the modulation circuit. In the aformentioned embodiments of FIGS. 1-4, the output circuits can be a switching voltage regulator, a linear voltage regulator, or a battery charger. The rectifiers can be bridge rectifiers and the switches of the modulation circuits can be JFET, MOSFET, or BJT, as illustrated in FIG. 5. In the aforementioned embodiments of FIGS. 1-4, the in-band controllers can modulate the gate voltage of the switch of the respective modulation circuit based on the use case. In other words, depending on the application, the equivalent resistance of the switch can be adjusted to change the parametric value of switch resistance and the LC circuit. By doing so, the output RDCV of the rectifier circuit can be held steady or adjusted to compensate for reflected power.

Figure 6:
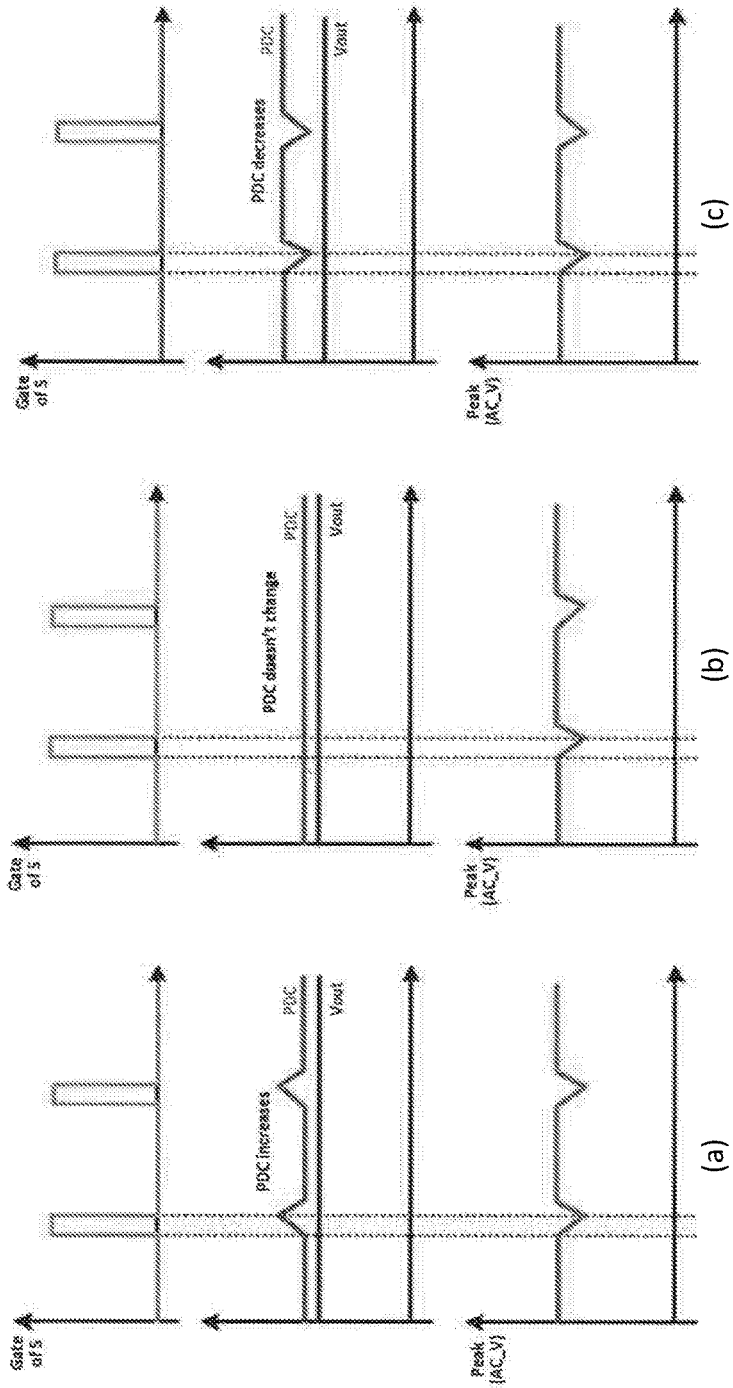
FIG. 6 depicts graphs of switch gate voltages, RDCV across the filtering capacitor on receiver, and peak AC voltage across the resonant capacitor on transmitter, according to certain example embodiments.

Referring now to FIG. 6, illustrated are graphs (a-c) for switch gate voltages, RDCV, output voltage of the output circuit, and peak AC voltage, according to certain example embodiments. In one use case, and as illustrated in FIG. 6(a), when the switch of a modulation circuit is turned on, the result is the peak value of reflected voltage on transmitter side (AC_V) is significantly reduced. When the switch is turned off, the voltage on the transmitter side increases to normal level. Also, RDCV voltage returns to normal level. In another use case, and as illustrated in FIG. 6(b), the RDCV voltage at receiver side can be held constant, i.e. not to change, increase or decrease, in response to the reflected signal. In yet another use case, and as illustrated in FIG. 6(c), the RDCV voltage at the receiver side can decrease in response to the reflected signal. The control of the RDCV voltage is dependent upon the dependent upon the equivalent series resistor (R). In any case, the methods of compensation result in more efficient delivery of RDCV power to the output circuit.

In a first example, the equivalent resistance is 20 mΩ and when the switch is turned on, the RDCV voltage increases and the reflected voltage decreases. When the switch is turned off, both RDCV voltage and reflected voltage decrease to steady-state value. In another example, the equivalent resistance is 60 mΩ and the RDCV voltage doesn't change when turning on the switch. While, the reflected voltage decreases which indicates the information sent from RX side to TX side. In another example, when the switch is turned on, the RDCV voltage and the reflected voltage decreases. When the switch is turned off, both RDCV voltage and reflected voltage increases to steady-state value.

By adjusting the gate signal of the switch, the voltage drop waveform on transmit side is different, which includes the information on receiver side. The information can be obtained by detecting the voltage drop on transmit side, which provides for in-band communications without an extra communication circuit, like WI-FI, Bluetooth and so forth. By setting the equivalent resistor using the receiver structures of FIGS. 1-4, RDCV voltage can be controlled to increase, decrease, or not change during modulation period. Under this condition, at idle time (no modulation), RDCV voltage is able to be set as low as possible (a little higher than output voltage). The RDCV voltage must be higher than the output voltage. If RDCV decreases during the modulation period, in order to keep RDCV voltage always higher than output voltage, the difference between RDCV and the output voltage can be large enough at idle time. If RDCV increases during the modulation period, the difference between RDCV and output voltage at idle time is small.

Example advantages and improvements over the prior art of the present disclosure include:
1) By having RDCV go up when modulating, the RDCV voltage at normal case can be reduced to a minimum value. So most of the time, the power sent out by TX can be low, which means a high efficiency on TX side;
2) If a BUCK regulator is connected as the output sate, high efficiency is achieved for the BUCK regulator with low input voltage;
3) Ability to connect to linear voltage regulator as output stage directly;
   a) In idle time (most of time), the RDCV voltage can be regulated to be close to the output voltage (a little bit high than output voltage). Then it can use the linear voltage regulator at the output state instead of BUCK regulator and achieve high efficiency; and
   b) During a modulation period, RDCV is higher and the linear voltage regulator can keep the output constant. Efficiency is lower, but that state is not maintained for a long time;
4) Ability to connect to battery charger as output stage directly:
   a) In idle time (most of time), the RDCV voltage can be regulated to be close to the output voltage (a little bit high than output voltage). Then it can use the linear voltage regulator at the output state instead of a BUCK regulator and can achieve high efficiency; and b) During the modulation period, RDCV is higher and the linear voltage regulator can keep the output constant. Efficiency is lower, but that state is not maintained for a long time;

5) Only one FET or one FET plus one resistor is needed (although other suitable components can also or alternatively be used), which can reduce the cost and size of the receiver circuit;

6) if a synchronous rectifier is used on RX side, the single-FET modulation circuit can be integrated into the synchronous rectifier. Thus, no extra circuit is needed; and 7) Easy to integrate the FET into RX part/IC chip.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A wireless charging receiver for receiving RF power from a transmitter comprising:
   rectifier circuit;
   an LC circuit coupled to the rectifier circuit and the transmitter;
   a single switch modulation circuit coupled to the rectifier circuit and the LC circuit; and
   an output circuit coupled to the rectifier circuit; and
   in-band controller coupled to the LC circuit and the single switch modulation circuit operational to detect a reflected parameter from incident RF power;
   wherein a resistance value of the single switch modulation circuit is set in response to a detected parametric value of the LC circuit; and
   wherein the single switch modulation circuit is a transistor.

2. The wireless charging receiver of claim 1 wherein the resistance value is set to cause the rectifier circuit to generate a stable voltage value with respect to a normal voltage value in response to the received RF power.

3. The wireless charging receiver of claim 1 wherein the resistance value is set to cause the rectifier circuit to generate an increased voltage value with respect to a normal voltage value in response to the received RF power.

4. The wireless charging receiver of claim 1 wherein the resistance value is set to cause the rectifier circuit to generate a decreased voltage value with respect to a normal voltage value in response to the received RF power.

5. The wireless charging receiver of claim 1 wherein the output circuit is one of a switching voltage regulator, a linear voltage regulator, or a battery charger.

6. A wireless charging receiver for receiving RF power from a transmitter comprising:
   a rectifier circuit;
   an LC circuit coupled to the rectifier circuit and the transmitter; and
   a single switch modulation circuit coupled to the rectifier circuit and the LC circuit;
   an in-band controller coupled to the LC circuit and the single switch modulation circuit operational to detect a reflected parameter from incident RF power;
   wherein a resistance value of the single switch modulation circuit is set in response to a detected parametric value of the LC circuit; and
   wherein the single switch modulation circuit is a transistor.

7. The wireless charging receiver of claim 6 wherein the resistance value is set to cause the rectifier circuit to generate a stable voltage value with respect to a normal voltage value in response to the received RF power.

8. The wireless charging receiver of claim 6 wherein the resistance value is set to cause the rectifier circuit to generate an increased voltage value with respect to a normal voltage value in response to the received RF power.

9. The wireless charging receiver of claim 6 wherein the resistance value is set to cause the rectifier circuit to generate a decreased voltage value with respect to a normal voltage value in response to the received RF power.

10. The wireless charging receiver of claim 1 further comprising: an output circuit coupled to the rectifier circuit; wherein the output circuit is one of a switching voltage regulator, a linear voltage regulator, or a battery charger.

11. A wireless charging receiver for receiving RF power from a transmitter comprising:
    a rectifier circuit;
    an LC circuit coupled to the rectifier circuit and the transmitter;
    a modulation circuit coupled to the rectifier circuit and the LC circuit; and
    an output circuit coupled to the rectifier circuit; and
    an in-band controller coupled to the LC circuit and the single switch modulation circuit operational to detect a reflected parameter from incident RF power;
    wherein an on-state resistance value of the single switch modulation circuit is set in response to a detected parametric value of the LC circuit; and
    wherein the single switch modulation circuit is a transistor.

12. The wireless charging receiver of claim 11 wherein the on-state resistance value is set to cause the rectifier circuit to generate one of: a stable voltage value with respect to a normal voltage value in response to the received RF power; an increased voltage value with respect to a normal voltage value in response to the received RF power; and a decreased voltage value with respect to a normal voltage value in response to the received RF power.

13. The wireless charging receiver of claim 11 wherein the output circuit is one of a switching voltage regulator, a linear voltage regulator, or a battery charger.

14. The wireless charging receiver of claim 11 wherein the modulation circuit is a single switch circuit.

\* \* \* \* \*